Feb. 7, 1967  L. G. URQUHART ET AL  3,302,667
PICKER-STICK BLOCK FOR LOOMS
Filed Sept. 21, 1965

INVENTOR.
Lloyd G. Urquhart
Francis A. Depuy
By Roberts, Cushman & Grover
ATT'YS

United States Patent Office 3,302,667
Patented Feb. 7, 1967

3,302,667
PICKER-STICK BLOCK FOR LOOMS
Lloyd G. Urquhart, Westboro, and Francis A. Depuy, Arlington, Mass., assignors to H. F. Livermore Corporation, Boston, Mass., a corporation of Delaware
Filed Sept. 21, 1965, Ser. No. 488,880
6 Claims. (Cl. 139—159)

This application is a continuation-in-part of application Serial No. 385,614, filed July 28, 1964, for Picker-Stick Block for Looms, now abandoned.

This invention relates to loom pickers which are mounted on picker sticks for engagement with shuttles and it has for its objects the provision of a block which is simple and economical in construction, which can be applied to picker sticks easily and quickly, and which is durable and reliable in use.

According to this invention the picker-stick block has an opening to receive a picker stick and a fastener opening extending inwardly from the front of the block to the stick opening, with a fastener extending through the fastener opening into engagement with the picker stick, the fastener being formed of tough elastic material to absorb shuttle shock, and means for adjusting the fastener lengthwise of its opening to clamp the block on the picker stick. In the preferred embodiment the block is formed of plastic material such as polypropylene, polycarbonate or hard urethane.

In a more specific aspect the picker-stick block has an opening to receive a picker stick and a threaded opening extending inwardly from the front of the block to the stick opening, and a screw extending through the threaded opening into engagement with the picker stick, the screw being formed of tough elastic material to absorb shuttle shock and being adjustable lengthwise to clamp the block on the picker stick. The screw opening may have a flaring mouth, the head of the screw being correspondingly flared, or the head of the screw may be reinforced by a rim of stronger material, or both. The preferred embodiment has means between the screw and picker stick to increase the friction between screw and stick. This means may comprise a pad of material which is softer than said material, or a bearing member extending laterally from the fastener opening in the stick opening.

Figure 1:
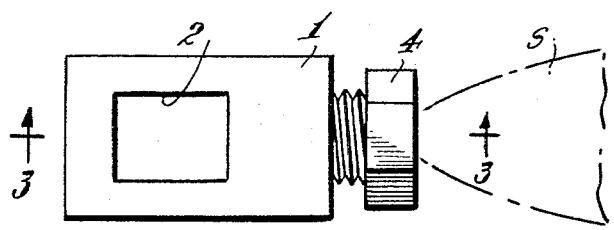
Figure 2:
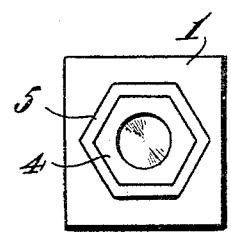
Figure 3:
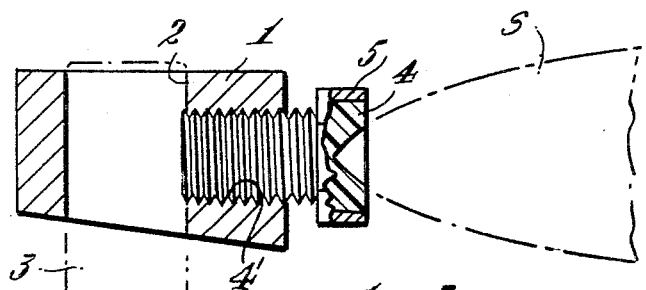
Figure 4:
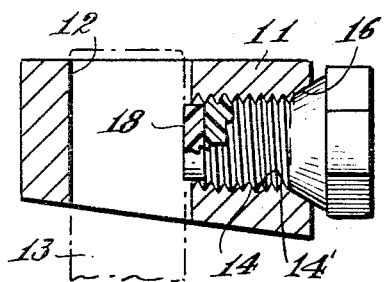
Figure 5:
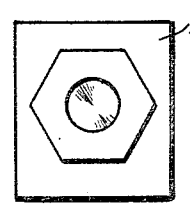
Figure 6:
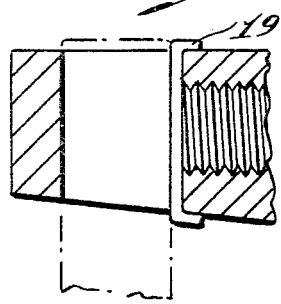
Figure 7:
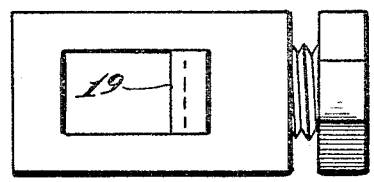

For the purpose of illustration a typical embodiment of the invention is shown in the accompanying drawings in which:

FIG. 1 is a plan view of a block showing a shuttle in broken lines;
FIG. 2 is an end view of the block viewed from the right of FIG. 1;
FIG. 3 is a section on line 3—3 of FIG. 1;
FIG. 4 is a view like FIG. 3 showing a modification;
FIG. 5 is an end view from the right of FIG. 4;
FIG. 6 is a view like FIGS. 3 and 4 showing another modification; and
FIG. 7 is a plan view of FIG. 6.

The particular embodiment of the invention shown in FIGS. 1 to 3 comprises a block 1 having an opening 2 for a picker stick 3 and a screw 4 threaded into an opening 4' through the lock from the side of the shuttle S. As shown in FIG. 3 the head of the screw preferably has a conical recess to receive the end of the shuttle.

The block 1 may be formed of any suitable material such as aluminum, light metal alloy, formed steel or plastic, but the material should be relatively rigid and not as resilient as the screw which is preferably made of quite resilient material such as polypropylene, polycarbonate or urethane. Thus the screw 4 serves the double purpose of holding the block on the picker stick and also affording yielding engagement with the shuttle. In use only the head of the screw is subject to much wear and therefore the picker may be renewed merely by replacing the screw. To increase the life of the screw 4 its head may be reinforced by a rim 5 of strong material such as steel. The rim may be fastened to the screw in any suitable way as, for example, by molding the screw in the rim or by shrinking the rim on the head after molding.

The modification shown in FIGS. 4 and 5 is like that shown in FIGS. 1 to 3 in that it comprises a block 11 having an opening 12 for a picker stick 13 and a screw 14 threaded through opening 14' in the block from the front. However it differs in that the screw opening has a flaring mouth 16 and the head of the screw is correspondingly flared to provide a larger mass which absorbs more shock without damage. The dimensions should be such that the screw clamps the picker stick tightly before the conical head of the screw seats on the flaring mouth 16. The head may also have a metal rim as in the first embodiment but with a conical head the rim is usually not necessary. Another difference consists in a pad 18 of soft urethane or other material softer than the screw material to increase the friction on the stick. The pad is preferably cemented to the end of the screw.

The modification shown in FIG. 6 differs from that shown in FIGS. 4 and 5 only in that the pad 18 is replaced by a U-shaped cap 19 which is formed of metal or other stiff material to increase the bearing surface, and therefore the friction, on the picker stick.

It should be understood that the present disclosure is for the purpose of illustration only and that this invention includes all modifications and equivalents which fall within the scope of the appended claims.

We claim:
1. A picker-stick block having an opening to receive a picker stick and a threaded opening extending inwardly from the front of the block to the stick opening, a screw extending through the threaded opening into engagement with the picker stick, the head of the screw having a tapered recess to receive the end of the shuttle and being formed of tough elastic material to absorb shuttle shock and the screw being adjustable lengthwise to clamp the block on the picker stick.
2. A picker-stick block according to claim 1 further characterized in that the head of the screw is reinforced by a rim of stronger material.
3. A picker-stick block according to claim 1 wherein the threaded opening has a flaring mouth and the head of the screw is correspondingly flared.
4. A picker-stick block according to claim 1 further characterized by means between said screw and picker stick to increase the friction between screw and stick.
5. A picker-stick block according to claim 4 wherein said means comprises a pad of material which is softer than said elastic material.

6. A picker-stick block according to claim 4 wherein said means comprises a bearing member extending laterally from said opening in the stick opening.

References Cited by the Examiner

UNITED STATES PATENTS

| | | | |
|---|---|---|---|
| 1,575,598 | 3/1926 | Gagnon | 139—159 |
| 2,103,991 | 12/1937 | Merrick | 139—159 |
| 2,586,065 | 2/1952 | La Rocque | 139—159 |
| 3,020,932 | 2/1962 | Rivera | 139—159 |
| 3,116,763 | 1/1964 | Nill | 139—159 |

FOREIGN PATENTS

| | | |
|---|---|---|
| 253,264 | 6/1926 | Great Britain. |
| 882,390 | 11/1961 | Great Britain. |

OTHER REFERENCES

Textile Industries, W. R. C. Smith publication, Atlanta, Ga., vol. 125, No. 10, Mid-September 1961, pp. 1–79 (copy available, Group 440).

MERVIN STEIN, *Primary Examiner.*

ROBERT R. MACKEY, *Examiner.*

J. KEE CHI, *Assistant Examiner.*